April 16, 1929.  H. D. THAYER  1,709,199
SANITARY MEANS AND METHOD FOR TRAPPING MICE
Filed Dec. 10, 1926
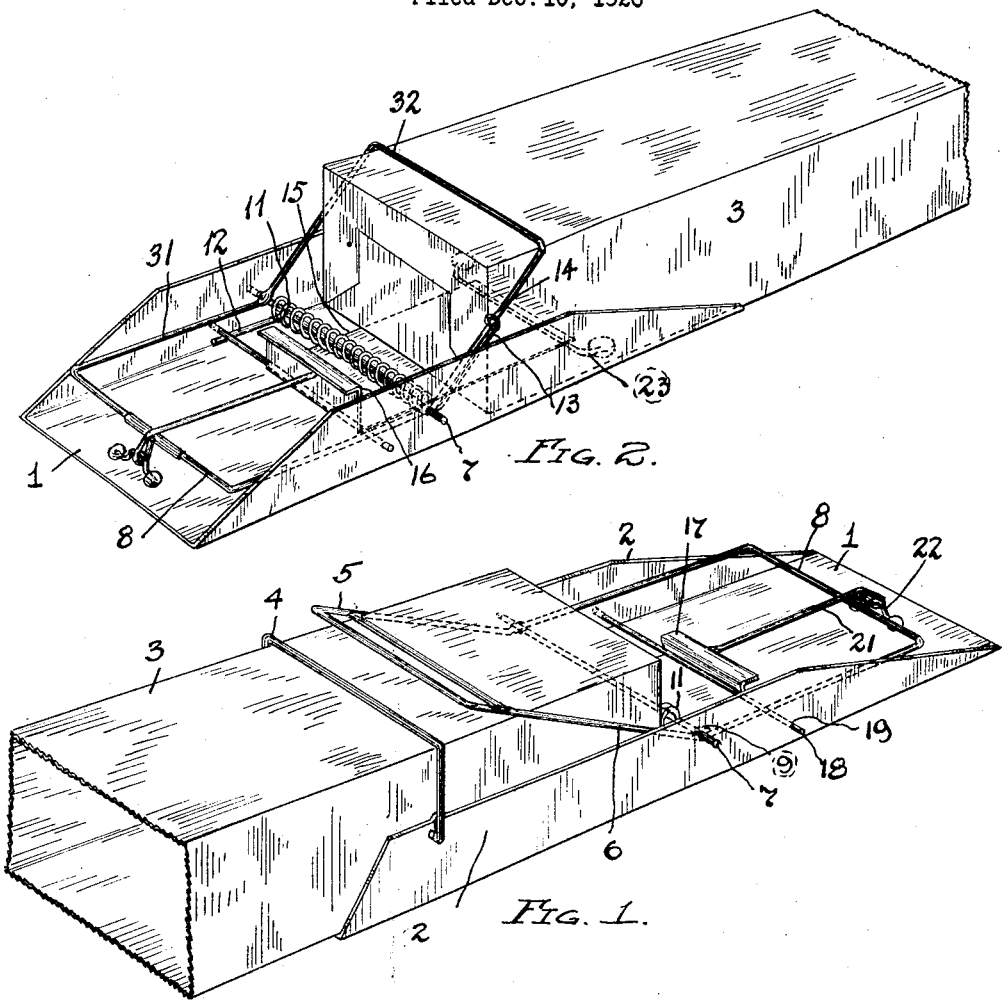
INVENTOR.
Heman D. Thayer
BY
Fay, Oberlin & Fay
ATTORNEYS Patented Apr. 16, 1929.

1,709,199

UNITED STATES PATENT OFFICE.

HEMAN D. THAYER, OF EAST SPRINGFIELD, PENNSYLVANIA.

SANITARY MEANS AND METHOD FOR TRAPPING MICE.

Application filed December 10, 1926. Serial No. 153,878.

This invention as indicated relates to a sanitary means and method for trapping mice or similar small animals. More particularly it comprises a trap embodying novel features and also especially adapted to cooperate with a receptacle of flexible material, preferably a paper bag to crush or suffocate the animal while the latter is wholly concealed from view. The trap includes a wire spring released by the animal when within said bag which serves to crush the animal just below the head and cause death by means of the blow or by suffocation, while keeping said animal at all times concealed within said receptacle and thus obviating the usual unsightly appearance of open mouse traps in common use as well as avoiding the necessity of scalding the trap, after it has been used, to remove the odor which otherwise would adhere to the same.

The annexed drawing and the following description set forth in detail certain means and one mode of carrying out the invention, such disclosed means and mode illustrating, however, but several of various ways in which the principle of the invention may be used.

In said annexed drawing:

Fig. 1 is a perspective view showing a trap associated with a paper bag of substantially rectangular outline when in open position; and Fig. 2 is a perspective view of a slightly modified form of trap as viewed from the end opposite to that shown in Fig. 1.

As is clearly shown in the drawing, the preferred form of trap comprises a base plate 1 having upstanding side walls 2 spaced apart a sufficient distance to receive between them adjacent one end a paper bag 3 or similar receptacle for the animal to be caught. A wire loop 4 may be provided within which the paper bag engages so as to assist in positioning the same. Immediately above the wire loop and in position to clear the same as it descends against the base of the trap, the forward end 5 of the snap bar frame 6 is positioned. The snap bar frame preferably has a double cross bar at its forward end. Instead of being formed of a short wire frame pivoted at one end and adapted to swing through an arc of 180 degrees as in mouse traps now in common use, I prefer to form the snap bar frame of wire bent to an elongated rectangular form and again bent adjacent the intermediate portions of its longer sides at an angle of approximately 120 degrees, at which point it is secured to a pivot bar 7. The frame thus provides a cross bar 8 at its lower end for engagement with the latching device. The snap bar frame may be pivoted at the angle between its forward and rearward sections in any preferred manner at a point adjacent the central portion of the trap. The pivot in the form shown is formed by soldering the frame to the pivot bar 7 transversely positioned across the base of the trap having its ends engaged through apertures 9 formed through the lower central portions of the side walls. A coil spring 11 is preferably wound about the pivot bar and a rearwardly projecting end 12 thereof is engaged against the base of the trap and the opposite projecting end 13 of the spring is formed with a terminal hook 14 which is engaged over one of the forward side frame portions of the snap bar.

The tripping mechanism for the snap bar frame comprises a trip plate having a horizontal section 15 and short section 16 extending upwardly at right angles thereto which latter section has a rearwardly extending flange 17 at its upper edge. It is soldered or otherwise secured to a transversely extending pivot bar 18, the ends of which are engaged through apertures 19 in the side walls rearwardly of and slightly below the pivot bar of the snap bar frame.

A wire holding bar 21 is pivotally mounted on a bar 22 secured to the base of the trap adjacent the rearward end and its forward end is adapted to engage beneath the rearwardly projecting flange of the trip plate when the horizontal portion of the latter is in elevated position. A wire bar 23 secured to the base plate limits the upward movement of the horizontal portion of the trip plate. The holding bar 21 is adapted to pass over the cross bar at the rearward end of the snap bar frame when the trap is in set position. When so positioned, the horizontal portion of the trip plate will be slightly elevated as stated and the bottom portion of the rearward end of the paper bag will rest upon said plate.

The trap shown in Fig. 2 differs from that shown in Fig. 1 in that the snap bar frame 31 has but a single bar 32 at its forward end. It likewise has no wire loop to engage about the central portion of the paper bag, the sides of the trap being adapted to closely engage the adjacent sides of the paper bag or other receptacle used.

While the drawing shows a paper bag, any like receptacle may be used, the object being to provide a receptacle of small cost which may be discarded with each mouse captured. The trap likewise would be effective without any receptacle although not as completely sanitary. The bait could be positioned on the broad trip plate and the animal could be released from the trap by touching only the rearward end of the trap. The rearward end of the snap bar frame does not come into contact with the mouse or the bait and is always in clean and sanitary condition.

The operation of the device will be readily understood from the description of its construction, but in some respects it differs from wire snap bar traps in general use. The paper bag is first engaged in proper position at the forward end of the trap with the closed end closely adjacent the central portion of the trap, which is set in position to be tripped. Bait of suitable character is placed in the bottom of the bag and as the mouse or other animal enters to take the bait, the weight of said animal upon the trip plate will serve to move the forward end of the snap bar frame downwardly and the flanged end forwardly. As the rearwardly projecting flange is moved forwardly it releases the forward end of the holding bar which is thrown backwardly, releasing in turn the rearward portion of the snap bar frame. The cross bar at the forward end of the snap bar frame descends rapidly against the upper side of the paper bag and crushes the animal between the forward cross bar and the base of the trap in the usual manner. The animal, however, will be fully concealed within the bag and no contact of the animal with the adjacent parts of the trap and no deposit of blood upon the mechanism will result. Thus the trap will be odorless at all times and will be maintained in an entirely sanitary condition without deodorizing inasmuch as no direct contact with the animal has at any time occurred.

The person using the trap may readily remove the captured animal by merely pressing the rearward section of the snap bar downwardly and thus raising the forward portion and releasing the bag which may be withdrawn by its upper edge portion and disposed of by dropping it into the garbage pail or elsewhere. A new paper bag carrying bait may then be installed within the trap which will be reset to be ready for further service. The paper bags may be provided with a prepared bait for rodents incorporated in its lower section, so that the installation of a new bag will require no further attention of the user.

Other means and mode of applying the principle of my invention may be employed instead of those explained, change being made as regards the means and the steps herein disclosed, provided those stated by any one of the following claims or their equivalents be employed.

I therefore particularly point out and distinctly claim as my invention:

1. A method of trapping small animals which comprises providing a flexible receptacle open at one end and having bait within the same adjacent the other end to attract the animal within the same, crushing said animal within said receptacle, and thereafter handling said receptacle by its forward end and disposing of both the animal and said receptacle.

2. An apparatus of the character described having in combination a receptacle of flexible material adapted to receive bait within the same, and means adjacent said receptacle for crushing the same at a point adjacent said bait.

3. An apparatus of the character described having in combination a base plate, a flexible receptacle adapted to be positioned upon said base plate, and means associated within said base plate for crushing said receptacle against said base plate.

4. An apparatus of the character described having in combination a base plate, a flexible receptacle adapted to be positioned upon said base plate, means associated within said base plate for crushing said receptacle against said base plate, and means for actuating said crushing means.

5. An apparatus of the character described having in combination a base plate, a flexible receptacle adapted to be positioned upon said base plate, means associated within said base plate for crushing said receptacle against said base plate, means for setting said crushing means under tension, and means for releasing said crushing means.

6. An apparatus of the character described having in combination a base plate provided with a snap bar spring pressed to normally lie in a position adjacent said base plate, means for supporting said snap bar in an elevated position, a flexible receptacle, means for positioning said receptacle beneath said snap bar, and means associated with said base plate for releasing said snap bar.

7. An apparatus of the character described having in combination a base plate provided with a snap bar spring pressed to normally lie in a position adjacent said base plate, means for supporting said snap bar in an elevated position, a flexible receptacle, means for positioning said receptacle beneath said snap bar, and means associated with said base plate beneath said receptacle for releasing said snap bar.

Signed by me this 4th day of December, 1926.

HEMAN D. THAYER.